(12) United States Patent
Bignolles et al.

(10) Patent No.: US 6,813,086 B2
(45) Date of Patent: Nov. 2, 2004

(54) HEAD-UP DISPLAY ADAPTABLE TO GIVEN TYPE OF EQUIPMENT

(75) Inventors: Laurent Bignolles, Bordeaux (FR); Jean-Marc Darrieux, Bordeaux (FR); Yannick Chevreau, Merignac (FR)

(73) Assignee: THALES, Paris (FR)

( * ) Notice: Subject to any disclaimer, the term of this patent is extended or adjusted under 35 U.S.C. 154(b) by 0 days.

(21) Appl. No.: 10/013,690

(22) Filed: Dec. 13, 2001

(65) Prior Publication Data

US 2002/0089757 A1 Jul. 11, 2002

(30) Foreign Application Priority Data

Dec. 19, 2000 (FR) .............................................. 00 16588

(51) Int. Cl.$^7$ .......................... G02B 27/14; G09G 5/00
(52) U.S. Cl. .......................... 359/630; 359/632; 345/7
(58) Field of Search ................. 359/630–632, 359/634, 13, 629; 345/7–8

(56) References Cited

U.S. PATENT DOCUMENTS

| | | | |
|---|---|---|---|
| 3,796,901 A | | 3/1974 | Mayer et al. |
| 4,218,111 A | | 8/1980 | Withrington et al. |
| 4,729,634 A | * | 3/1988 | Raber .......................... 359/630 |
| 4,749,256 A | | 6/1988 | Bell et al. |
| 4,763,990 A | * | 8/1988 | Wood ............................. 345/7 |
| 5,007,711 A | | 4/1991 | Wood et al. |
| 5,467,480 A | | 11/1995 | Baudou et al. |
| 5,479,294 A | | 12/1995 | Darrieux et al. |
| 5,517,337 A | | 5/1996 | Dupin et al. |
| 5,553,328 A | * | 9/1996 | Hall et al. ................... 359/632 |
| 5,581,806 A | | 12/1996 | Capdepuy et al. |
| 5,623,730 A | | 4/1997 | Baudou et al. |
| 5,742,937 A | | 4/1998 | Baudou et al. |
| 5,880,888 A | * | 3/1999 | Schoenmakers et al. .... 359/630 |
| 5,940,218 A | | 8/1999 | Takahashi et al. |
| 6,014,769 A | | 1/2000 | Baudou et al. |
| 6,046,867 A | | 4/2000 | Rana |
| 6,078,428 A | | 6/2000 | Rambert et al. |
| 6,157,471 A | | 12/2000 | Bignolles et al. |
| 6,158,866 A | | 12/2000 | Gulli et al. |
| 6,188,521 B1 | * | 2/2001 | Tanaka et al. .............. 359/631 |
| 6,262,849 B1 | | 7/2001 | Potin et al. |
| 6,342,872 B1 | | 1/2002 | Potin et al. |

FOREIGN PATENT DOCUMENTS

| | | |
|---|---|---|
| EP | 0 007 039 | 1/1980 |
| FR | 2 732 479 | 10/1996 |
| WO | WO 9820380 | 5/1998 |

OTHER PUBLICATIONS

M. Green, Electro–Optics, vol. 15, No. 7, pp. 37–41, "Brighter Cockpit Displays: Controlling Reflection in Cockpit Displays", Jul. 1983.

* cited by examiner

Primary Examiner—Georgia Epps
Assistant Examiner—Alicia M. Harrington
(74) Attorney, Agent, or Firm—Oblon, Spivak, McClelland, Maier & Neustadt, P.C.

(57) ABSTRACT

A head-up display including a combiner and a relay optics formed from a combination of optical elements and forming an intermediate image projected to infinity by the combiner of a symbology emitted in a given spectral band by an image source. The combiner forms an off-axis convergent mirror in the spectral band, and an angle of inclination of the off-axis convergent mirror is adjustable for a given type of equipment as a function of a position of the image source and in a given angular range that depends on the type of equipment. The relay optics is modular and includes a first module with at least one optical element fixed regardless of the type of equipment and a second module with at least one optical element for which a position is predefined as a function of an angular position of the combiner.

13 Claims, 3 Drawing Sheets

HEAD-UP DISPLAY ADAPTABLE TO GIVEN TYPE OF EQUIPMENT

BACKGROUND OF THE INVENTION

The invention relates to a head-up display adaptable to equipments of a given type, for example aircraft type, land vehicle type or helmet type, and a process for making a set of head-up displays adapted to such equipments.

DESCRIPTION OF THE PRIOR ART

The head-up display is an optomechanical device capable of superposing a symbology projected to infinity, in other words sufficiently far away so that a pilot does not need to make any substantial accommodation to see the symbology, onto the external surroundings as seen by the aircraft pilot or the vehicle driver or the person wearing the helmet (hereinafter referred to as the "pilot", for reasons of simplicity). The symbology is sent by a usually monochromatic image source, and for example comprises synthetic images and reticles or images originating from infrared sensors capable of seeing the surroundings even on a particularly dark night.

Conventionally, the head-up display (HUD) comprises an optical element called a combiner, that superposes the external surroundings and the symbology projected to infinity by projection optics. For example, the combiner may be an inclined flat sheet coated with a treatment that is reflecting at the wavelength of the image source emitting the symbology and transparent in the visible at other wavelengths, so that a maximum amount of the flux emitted by the external surroundings can be transmitted. However, if the field of vision necessary to see the symbology is large (for example for night vision), it is preferable to use a "convergent" combiner, in other words that behaves like a convergent mirror (for example, a spherical mirror) at the wavelength of the image source, in order to reduce the size of optical elements forming the projection optics. In this case the projection lens, also called the relay optics, forms an intermediate image of the symbology projected by the combiner to infinity. A convergent combiner is particularly necessary when the optical distance between the pilot's eye and the relay optics is large, which is the case for example in transport aircraft.

But the use of an off-axis convergent combiner, in other words a combiner with a non-zero angle of inclination with the central observation axis of the pilot, necessarily introduces eccentricity aberrations that have to be corrected to provide the pilot with a satisfactory quality image. These aberrations may be corrected by choosing optical elements in the relay optics, and/or by sizing a specific combiner (for example, aspherical combiner). In general, correction of eccentricity aberrations requires the use of specific optical elements in the relay optics, for example cylindrical, aspherical lenses, prisms or other elements that are not rotationally symmetric.

Since eccentricity aberrations depend on the angle of inclination of the combiner, an optical architecture would have to be resized for each installation of a head-up display in two or more items of equipment of a given type, for example an aircraft, land vehicle or helmet, in order to achieve an acceptable correction level. Thus, for example for different models of aircraft when size problems in the pilot's cockpit are different, positioning constraints on the relay optics with respect to the pilot's head are also different. In this case, the optical architecture has to be resized for each aircraft model, to adapt the angle of inclination of the combiner and to correct eccentricity aberrations related to the value of the angle of inclination. This means that the final development costs are very high.

SUMMARY OF THE INVENTION

In order to overcome these disadvantages, the invention presents a head-up display adaptable to a set of equipments of a given type, with a modular relay optics comprising a first module with at least one optical element that is fixed regardless of the equipment, and a second module with at least one optical element, the position of which is predefined as a function of the angular position of the combiner. More specifically, the invention relates to a head-up display as defined in claim 1.

The invention also presents a process for making a set of head-up displays adapted to equipments of a given type, as defined in claim 8, that can be used to make head-up displays adapted to equipments with different installation configurations without the need to develop a new optical architecture for each item of equipment, and also maintaining the same level of correction of eccentricity aberrations.

BRIEF DESCRIPTION OF THE DRAWINGS

Other characteristics and advantages of the invention will become evident on reading the description below of a preferred embodiment, which is non-limitative and taken only as an example, with reference to the attached drawings of which.

In these figures, identical elements are indexed with the same marks.

DESCRIPTION OF A PREFERRED EMBODIMENT

Figure 1A:
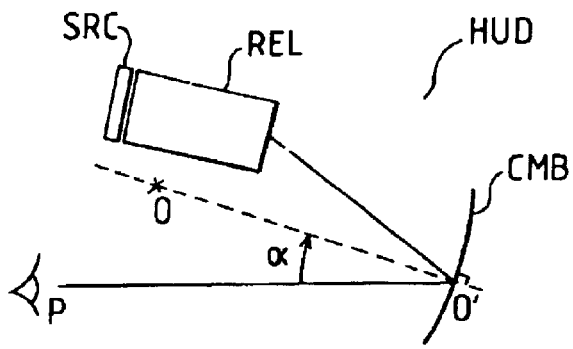
FIGS. 1A and 1B represent diagrams illustrating examples of installations of a head-up display in an aircraft.
Figure 1B:
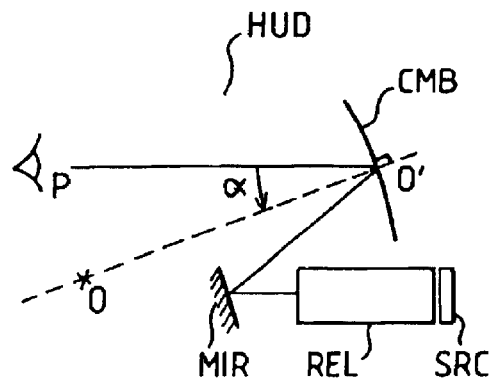

FIGS. 1A and 1B show diagrams illustrating two examples of installations of a head-up display HUD, for example in a transport aircraft, to help the pilot in difficult flying phases. The head-up display comprises an image source SRC, relay optics REL, a convergent combiner CMB. The SRC source emits in a given spectral band, usually around a predetermined wavelength, a symbology including for example synthetic images, reticles or images originating from infrared sensors. For example, the image source may be composed of a cathode ray tube emitting in the green, or an imager with liquid crystals. The relay optics REL is formed from a combination of optical elements and forms an intermediate image from the symbology that is projected to infinity, towards the pilot, through a convergent combiner CMB. The combiner CMB is an optical component that superposes the symbology projected to infinity onto the external surroundings observed by the pilot and that behaves like a convergent mirror in the spectral band of the image source, capable of projecting the intermediate image formed by the relay optics to infinity. It is approximately transparent to other wavelengths in the visible so that a maximum amount of the flux emitted by the external surroundings can be transmitted. To satisfy the size constraints for the relay optic, the combiner necessarily works off-axis; in other words there is a non-zero angle of inclination α with the central pilot observation axis PO' (defined as the line of sight at the center of the pilot's observation field). More precisely, the angle of inclination α is defined as being the angle between the central axis PO' and the normal axis OO' defined as being the axis normal to the surface tangent to the equivalent convergent mirror formed by the combiner at the intersection point O' of the central axis PO' with the said equivalent mirror. FIG. 1A illustrates an example installation in which the relay optics is installed above the pilot's head, while the relay optics is positioned in front of the pilot in the example shown in FIG. 1B.

Figure 2:
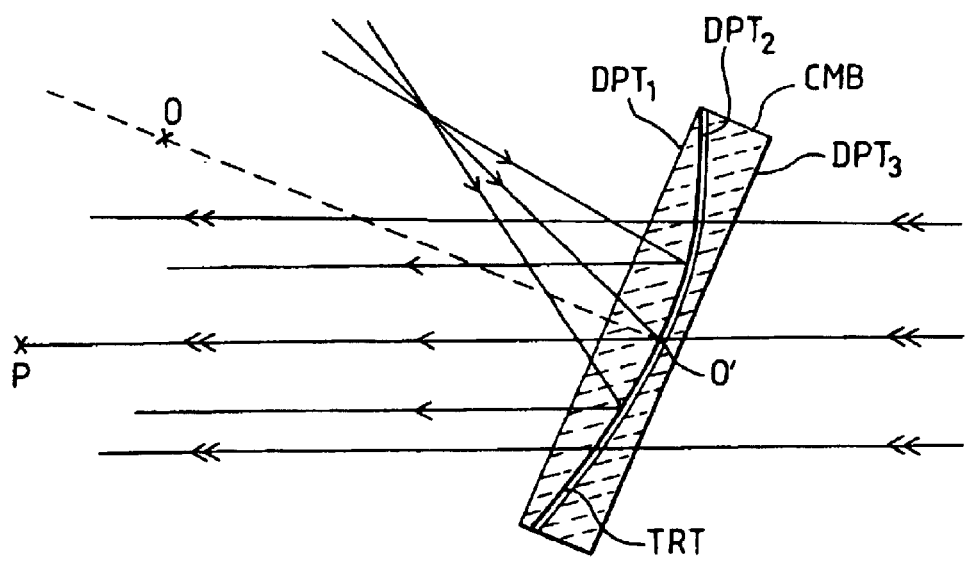
FIG. 2 is a diagram showing an example embodiment of a convergent combiner.

As can be seen in FIG. 2, the convergent combiner CMB may for example be formed of three diopters, including a first plane diopter $DPT_1$, a second curved diopter $DPT_2$, and a third plane diopter $DPT_3$ parallel to the first diopter $DPT_1$, the refraction indexes of the media between the first and the second diopter and between the second and the third diopter being approximately the same. The second diopter is coated with a TRT treatment that is practically reflecting in the spectral band of the image source and is practically transparent in the visible, outside the said spectral band. Thus, the combiner behaves like a convergent mirror for the light flux (indicated by a simple arrow) output from the image source and like a sheet with plane and parallel faces for the light flux (indicated by a double arrow) output from the surroundings, outside the spectral band of the image source. For example, the diopter $DPT_2$ may be spherical, the combiner then behaves like a spherical mirror. FIG. 2 also shows the central observation axis PO' and the normal axis OO' which, in the case of a spherical diopter $DPT_2$, is coincident with a radius of the said sphere. For example, the TRT treatment may be a holographic treatment adapted to the wavelength of the image source SRC. According to one variant, the combiner CMB may also be formed from a sheet with plane and parallel faces coated with a holographic treatment that performs the selective reflection/transmission function and also the phase function.

In the case of a helmet display, the helmet sight itself performs the combiner function. It is then covered by a suitable semi-reflecting treatment. Its small thickness is sufficient to limit distortion of the observed external surroundings.

In the following, the convergent combiner CMB is assimilated to the convergent mirror to which it is the equivalent.

The use of a off-axis convergent combiner as illustrated for example in FIG. 1A, 1B or 2 causes the appearance of eccentricity aberrations that have to be corrected to provide the pilot with good quality images. The correction may be made by choosing optical elements of the relay optics REL. It may also be made if a combiner is used in the form of a holographic component, by calculating a phase function that partially compensates for these aberrations.

The eccentricity aberrations vary depending on the angle of inclination of the off-axis combiner, and the characteristics of the relay optics and/or the combiner have to be redefined to achieve a good image quality for the pilot.

The invention proposes a head-up display adaptable to a set of equipments of a given type, for example an aircraft type, a land vehicle type or a helmet type. According to the invention, an equipment type is characterized particularly by an angular range within which the angle of inclination of the combiner can be adjusted to satisfy the size constraints of each given type of equipment. For example in the case of aircraft, an equipment type is defined characterized by an angular adjustment range of the combiner varying from 10° to 30°, which is sufficient to cover a large number of civil or military aircraft with different size constraints. In the case of helmets, an angular range of 20° to 40° is more appropriate for characterizing this type of equipment.

According to the invention, the combiner forms an off-axis convergent mirror in the spectral band of the image source, for which the angle of inclination α is adjusted for a given equipment as a function of the position of the image source in the said equipment, and within a given angular range depending on the equipment type. Furthermore, the relay optics is modular, comprising a first module with at least one optical element that is fixed regardless of the equipment, and a second module with at least one optical element for which the position is predefined as a function of the angular position of the combiner.

The invention also proposes a process for making a set of head-up displays adapted to equipments of a given type, for example an aircraft, land vehicle or helmet type. The process according to the invention comprises the adjustment of the angle of inclination α of the combiner CMB, when manufacturing a display adapted to given equipment, as a function of the position of the image source SRC in the said equipment, the angle of inclination varying within an angular range that depends on the equipment type. It also includes compensation of aberration variations induced by the angular adjustment of the combiner, by the displacement of one or several elements of the relay optics, by a predefined value as a function of the angle of inclination of the combiner, at least one of the other said elements of the relay optics remaining fixed.

Thus, the same combiner is used when making displays adapted to equipments of a given type, but laid out according to an appropriate angle of inclination, and variations of aberrations induced by the new angle of inclination of the combiner are corrected by moving one or several elements of the relay optics according to a predefined value, without needing to redefine the architecture of the relay optics, or to recalculate an appropriate combiner. The elements of the relay optics are identical from one display to another; but one or several of these elements are laid out differently in the optical combination to compensate for aberration variations. Thus, displays according to the invention are modular and have identical optical elements, but some of them are laid out differently.

According to the invention, the angular adjustment of the combiner may be discrete, and the angle of inclination may be set to two or more values. In this case, the element(s) of the relay optics is (are) displaced for example by means of stands used to fix each of the said elements in a position that depends on the angular position of the combiner, this position being predefined. An element of the relay optics can also be moved by replacing the mechanical support that contains this element by a mechanical support for which the interface controls placement in the new position.

It is also possible to provide approximately continuous positioning of the element(s) of the relay optics to be displaced, depending on the angle of inclination of the combiner. An adjustment system then needs to be provided to put them in the right position for each new angle of the combiner. For example, this adjustment may be made on a bench by attempting to optimize the image quality.

Advantageously according to the invention, aberration variations induced by the angular adjustment of the combiner are compensated by moving a single element of the relay optics, for example this displacement consisting of a rotation about its axis and/or a translation with respect to the adjacent optical element. The applicant has shown that this element can advantageously be composed of the first optical element of the relay optics through which the light flux output from the image source passes. Moving this element appears to be the most efficient way of correcting aberrations. In this case, this element is fixed to the image source SRC, such that when it is moved to compensate for aberration variations induced by the adjustment of the off-axis combiner, the image source is displaced in the same way to not disturb the projection to infinity of the symbology emitted by the said source.

We will now describe examples of head-up displays according to the invention.

Figure 3:
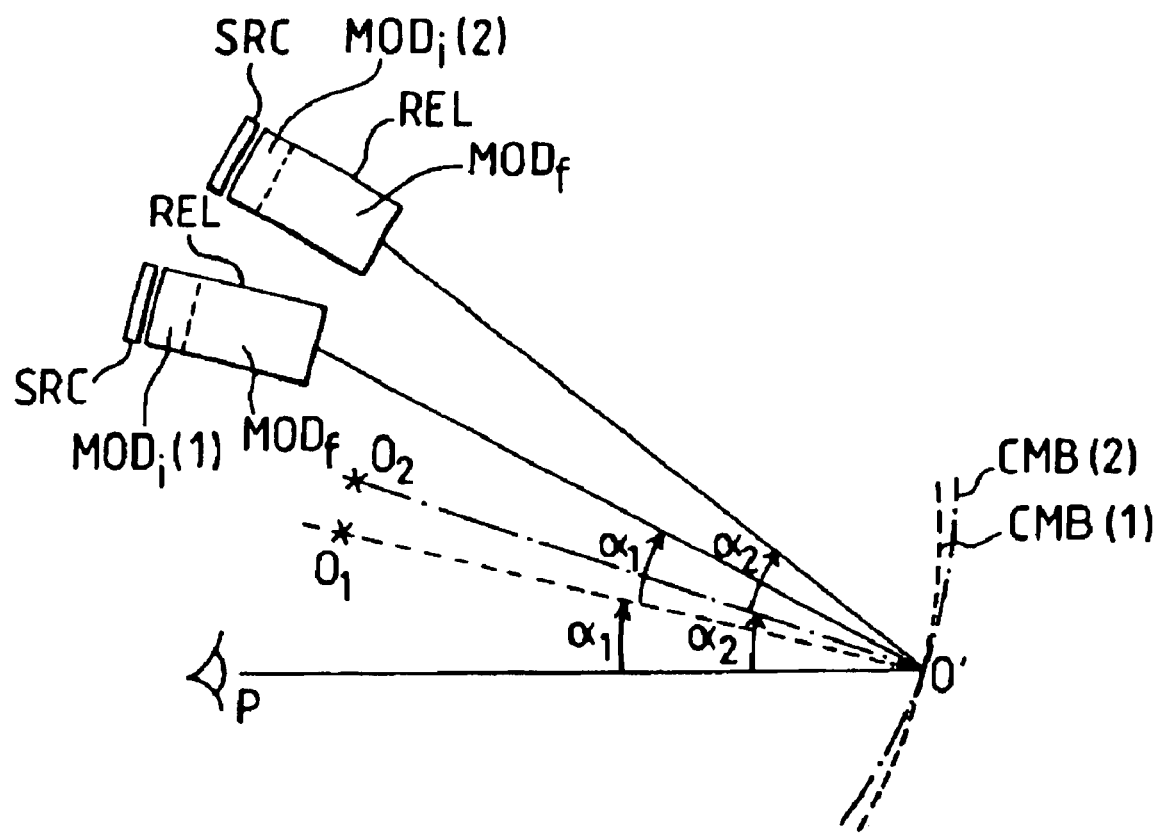
FIG. 3 is a diagram showing an example of a modular head-up display installation according to the invention.

FIG. 3 shows a diagram illustrating an example installation of head-up displays according to the invention in two items of aircraft type equipments. For each equipment, a display is adapted with a convergent combiner adjusted to a position denoted CMB(1) and to a position denoted CMB(2) respectively corresponding to two angles of inclination $\alpha_1$ and $\alpha_2$, where $\alpha_1$ is less than $\alpha_2$ defined by the angles between the central observation axis PO' and the axes $O_1O'$ and $O_2O'$ normal to the combiner in positions CMB(1) and CMB(2) respectively. For example, position CMB(1) shown in short dashed lines in FIG. 3, may corresponds to an installation of the head-up display in a civil aircraft in which the size constraint is applicable particularly to the top of the aircraft, due to metallic structures, whereas for example position CMB(2) shown in chained dotted lines, corresponds to an installation of the head-up display in a warplane in which a large distance between the relay optics and the pilot's head is necessary to allow room for a helmet to be worn.

In the example in FIG. 3, the elements of the relay optics of the displays may be grouped in two modules. A first module denoted $MOD_f$, is formed from the first optical element of the combination through which the light flux from the image source SRC passes and is fixed to the said source. A second module denoted $MOD_f$, is formed from the other elements of the relay optics, these elements being fixed to each other. In this example, when a display is manufactured, the angle of inclination of the combiner is adjusted to bring the combiner into either position CMB(1) or position CMB(2). The module $MOD_f$ remains fixed in the optical combination forming the relay optics. In this example, only module $MOD_i$ is displaced to compensate for aberration variations induced when the angle of inclination of the combiner is changed, moving from position $MOD_i(1)$ to position $MOD_i(2)$, for the display for which the combiner is in position CMB(1) or CMB(2) respectively. For example, this displacement consists of rotating the optical element forming module $MOD_i$ about its axis and a translation with respect to the directly adjacent optical element.

Figure 4A:
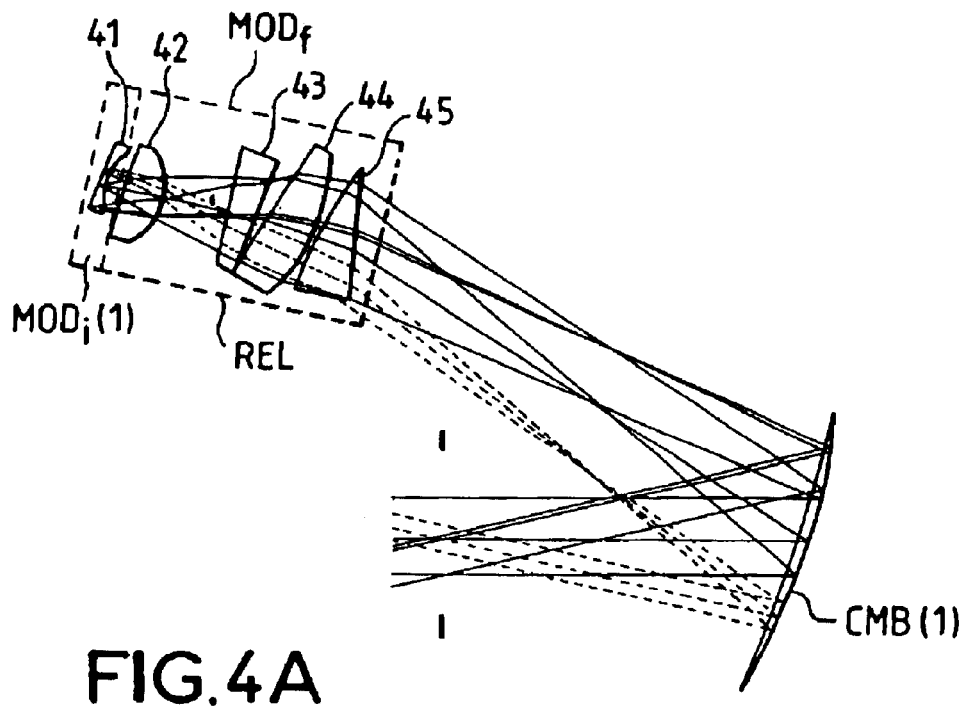
FIGS. 4A and 4B show the lines of beams in an example of a modular display according to the invention for two angles of inclination of the combiner.
Figure 4B:
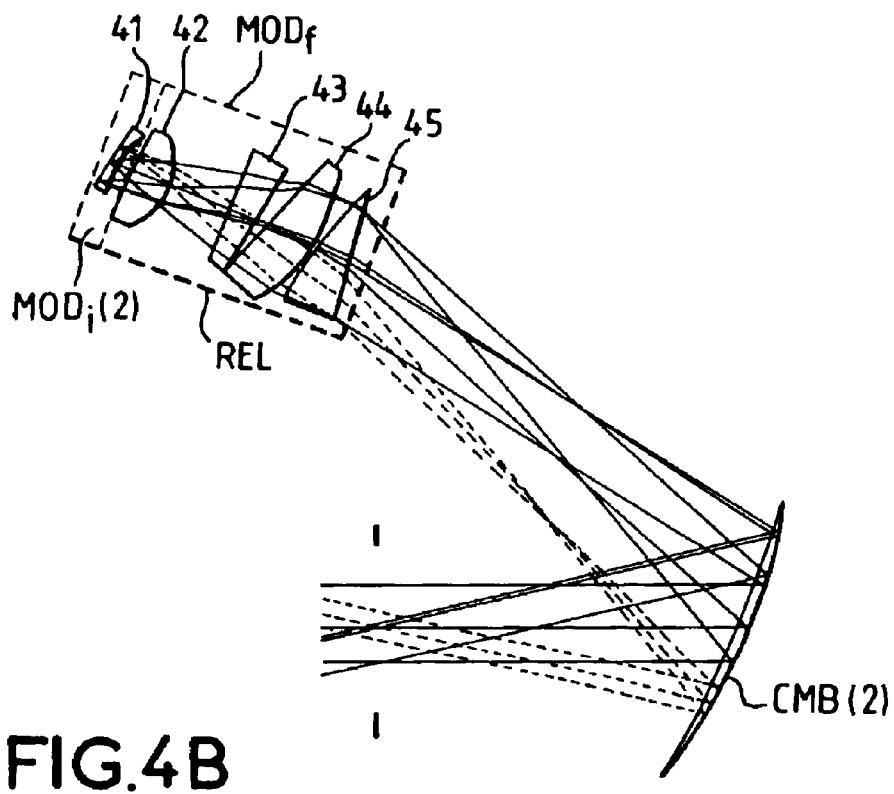

FIGS. 4A and 4B illustrate a more precise example showing the line of rays between two different head-up displays, obtained with the process according to the invention and applicable to an aircraft type characterized by an angular range varying from approximately 10° to 30°, that can be used for example to obtain head-up displays adapted to civil aircraft and warplanes. In this example, the equivalent mirror on combiner CMB is spherical. In the sight illustrated by the example in FIG. 4A, the angle of inclination of the combiner for which the position is denoted CMB(1) is equal to about 18°. For example, this configuration corresponds to a head-up display adapted to a civil aircraft. In the display illustrated in the example in FIG. 4B, the angle of inclination of the combiner for which the position is denoted CMB(2) is equal to about 24°. For example, this configuration may correspond to a head-up display adapted to a warplane. In this case the optical relay REL is formed from a combination of five optical elements for each display, denoted 41, 42, 43, 44, 45 respectively, grouped as in the previous example into two modules $MOD_i$ and $MOD_f$. In this example, only module $MOD_i$ fixed to the image source and composed of the first optical element 41 through which the light flux output from the image source (not shown) passes is displaced between the two displays to compensate for aberration variations. The other module $MOD_f$, composed of the other four optical elements 42, 43, 44, 45, remains in the same position in the relay optics REL of each of the two displays. In this example, the aberration variations induced by the variation in the angle of inclination of the combiner are compensated by making a displacement on the mobile module $MOD_i$ fixed to the image source, for example the displacement consisting of a rotation about its axis, a translation and an eccentricity from the adjacent optical element 42.

Thus, the invention proposes a head-up display adaptable to different installations requiring a variation in the angle of inclination of the off-axis convergent combiner without having to develop a specific optical architecture for each particular installation. The example applications of modular head-up displays according to the invention are not limited to the examples in FIGS. 3, 4A and 4B. In particular, the invention can be used for applications in the automotive industry, or for head-up displays for which the angle of inclination of the sight may vary depending on the model.

What is claimed is:

1. A head-up display, comprising:
   a combiner; and
   a relay optics formed from a combination of optical elements and forming an intermediate image of a symbology emitted in a given spectral band by an image source, said intermediate image being projected to infinity by said combiner,
   the combiner forming an off-axis convergent mirror in the spectral band, an angle of inclination of the off-axis convergent mirror being adjustable for a given type of equipment as a function of a position of the image source and in a given angular range that depends on the type of equipment,
   the relay optics being modular and including a first module with at least one optical element fixed regardless of the type of equipment and a second module having a single optical element positioned closest to the image source, and
   the single optical element of the second module being movable with respect to at least one adjacent optical element of the first module such that aberration variations induced by the angular adjustment of the combiner are compensated.

2. The head-up display according to claim 1, wherein between two settings of the angle of inclination of the combiner, said single optical element of the second module can be set in two positions separated from each other by at least one of a rotation and a translation with respect to the at least one adjacent optical element.

3. The head-up display according to claim 1, wherein said relay optics includes stands for fixing the single optical element of said second module in a position that depends on the angle of inclination of the combiner.

4. The head-up display according to claim 3, wherein a helmet sight forms the combiner, and the angle of inclination of said combiner is within an angular range between approximately 20° and 40°.

5. The head-up display according to claim 1, wherein said image source is placed above a pilot and the angle of inclination of the combiner is within an angular range between approximately 10° and 30° depending on the type of equipment.

6. The head-up display according to claim 5, wherein said relay optics includes a combination of 4 to 6 optical elements, and wherein said single optical element is fixed to said image source.

7. The head-up display according to claim 1, wherein a helmet sight forms the combiner, and the angle of inclination of said combiner is within an angular range between approximately 20° and 40°.

8. A process for making a set of head-up displays adapted to a given type of equipment, including a combiner and forming an off-axis convergent mirror, and a relay optics formed from a combination of optical elements and forming an intermediate image projected to infinity by said combiner of a symbology emitted in a given spectral band by an image source, the process comprising:

adjusting an angle of inclination of the combiner as a function of a position of the image source and within an angular range that depends on the type of equipment; and compensating aberration variations induced by the angular adjustment of the combiner by displacing a single optical element of the relay optics positioned closest to the image source a predefined value as a function of the angle of inclination of the combiner, and fixing in place at least one of the other optical elements of the relay optics, the single optical element being movable with respect to an adjacent optical element of the other optical elements.

9. The process according to claim 8, wherein said displacing said single optical element includes at least one of rotating and translating with respect to the adjacent optical element.

10. The process according to claim 9, wherein said adjusting the angle of inclination of the combiner is discrete, and wherein said displacing the single optical element of the relay optics is achieved by stands that fix said single optical element in a position that depends on an angular position of the combiner.

11. The process according to claim 9, wherein said adjusting the angle of inclination of the combiner is continuously made within the angular range, and wherein said displacing the single optical element of the relay optics is a function of an angular position of the combiner.

12. The process according to claim 8, wherein said adjusting the angle of inclination of the combiner is discrete, and wherein said displacing the single optical element of the relay optics is achieved by stands that fix said single optical element in a position that depends on an angular position of the combiner.

13. The process according to claim 8, wherein said adjusting the angle of inclination of the combiner is continuously made within the angular range, and wherein said displacing the single optical element of the relay optics is a function of an angular position of the combiner.

* * * * *